(12) United States Patent
Lee et al.

(10) Patent No.: US 10,276,864 B2
(45) Date of Patent: Apr. 30, 2019

(54) ANODE ACTIVE MATERIAL FOR LITHIUM SECONDARY BATTERY AND LITHIUM SECONDARY BATTERY COMPRISING THE SAME

(71) Applicant: LG Chem, Ltd., Seoul (KR)

(72) Inventors: Yong-Ju Lee, Daejeon (KR); Yoon-Ah Kang, Daejeon (KR); Je-Young Kim, Daejeon (KR); Seung-Youn Choi, Daejeon (KR); Mi-Rim Lee, Daejeon (KR); Hye-Ran Jung, Daejeon (KR); Jung-Woo Yoo, Daejeon (KR)

(73) Assignee: LG Chem, Ltd. (KR)

( * ) Notice: Subject to any disclaimer, the term of this patent is extended or adjusted under 35 U.S.C. 154(b) by 1091 days.

(21) Appl. No.: 14/326,582

(22) Filed: Jul. 9, 2014

(65) Prior Publication Data

US 2014/0322601 A1    Oct. 30, 2014

Related U.S. Application Data

(63) Continuation of application No. PCT/KR2013/011031, filed on Nov. 29, 2013.

(30) Foreign Application Priority Data

Nov. 30, 2012 (KR) .................. 10-2012-0138258
Nov. 29, 2013 (KR) .................. 10-2013-0147707

(51) Int. Cl.
*H01M 4/38* (2006.01)
*H01M 4/04* (2006.01)
(Continued)

(52) U.S. Cl.
CPC ......... *H01M 4/386* (2013.01); *H01M 4/0471* (2013.01); *H01M 4/0483* (2013.01);
(Continued)

(58) Field of Classification Search
None
See application file for complete search history.

(56) References Cited

U.S. PATENT DOCUMENTS

| 8,105,699 B2 * | 1/2012 | Katoh | B22F 1/0007 106/14.05 |
| 2006/0040182 A1 * | 2/2006 | Kawakami | H01M 10/052 429/218.1 |

(Continued)

FOREIGN PATENT DOCUMENTS

| EP | 2 246 922 A1 | 11/2010 | |
| JP | 11-323215 | * 11/1999 | .............. C09D 7/12 |

(Continued)

OTHER PUBLICATIONS

Supplemental search report from European Application No. 13857715, dated Apr. 20, 2015.
(Continued)

*Primary Examiner* — Rena Dye Cronin
(74) *Attorney, Agent, or Firm* — Lerner, David, Littenberg, Krumholz & Mentlik, LLP

(57) ABSTRACT

The anode active material of the present invention comprises silicon-based particles obtained from at least one of silicon, a silicon oxide and a silicon alloy, and the silicon-based particles have a faceted shape, thereby providing high capacity and good life characteristics without causing any deterioration which has been generated in the use of conventional silicon-based particles, and eventually providing a lithium secondary battery having such characteristics.

15 Claims, 4 Drawing Sheets

Line Contact or Area Contact

(51) Int. Cl.
*H01M 4/134* (2010.01)
*H01M 4/1395* (2010.01)
*H01M 4/48* (2010.01)
*H01M 4/02* (2006.01)
*H01M 10/052* (2010.01)
*C22C 1/10* (2006.01)

(52) U.S. Cl.
CPC ......... *H01M 4/0488* (2013.01); *H01M 4/134* (2013.01); *H01M 4/1395* (2013.01); *H01M 4/48* (2013.01); *C22C 1/10* (2013.01); *H01M 10/052* (2013.01); *H01M 2004/021* (2013.01); *H01M 2004/027* (2013.01)

(56) References Cited

U.S. PATENT DOCUMENTS

| | | | |
|---|---|---|---|
| 2007/0037063 A1 | 2/2007 | Choi et al. | |
| 2009/0061322 A1* | 3/2009 | Kawakami | H01M 10/052 |
| | | | 429/231.95 |
| 2009/0186273 A1* | 7/2009 | Lee | H01M 4/134 |
| | | | 429/217 |
| 2009/0202911 A1 | 8/2009 | Fukuoka et al. | |
| 2010/0258759 A1* | 10/2010 | Archer | B82Y 30/00 |
| | | | 252/62.56 |
| 2010/0279172 A1* | 11/2010 | Hwang | H01M 4/131 |
| | | | 429/219 |
| 2010/0301276 A1 | 12/2010 | Lee et al. | |
| 2013/0045424 A1 | 2/2013 | Sugiura et al. | |
| 2015/0099185 A1* | 4/2015 | Joo | D01D 5/003 |
| | | | 429/231.8 |

FOREIGN PATENT DOCUMENTS

| | | |
|---|---|---|
| JP | 2009212074 A | 9/2009 |
| JP | 201165983 | 3/2011 |
| JP | 4703785 B2 | 6/2011 |
| JP | 2012178299 A | 9/2012 |
| JP | 2013122905 A | 6/2013 |
| KR | 20090054834 A | 6/2009 |
| KR | 20120051828 A | 5/2012 |
| KR | 20100127990 A | 12/2012 |
| WO | 2004/086539 A1 | 10/2004 |
| WO | 2012067298 A1 | 5/2012 |

OTHER PUBLICATIONS

International Search Report for PCT/KR2013/011031 dated Mar. 20, 2014.

* cited by examiner

Line Contact or Area Contact

Point Contact

ANODE ACTIVE MATERIAL FOR LITHIUM SECONDARY BATTERY AND LITHIUM SECONDARY BATTERY COMPRISING THE SAME

CROSS-REFERENCE TO RELATED APPLICATION

This application is a continuation of International Application No. PCT/KR2013/011031 filed on Nov. 29, 2013, which claims priority under 35 USC 119(a) to Korean Patent Application Nos. 10-2012-0138258 and 10-2013-0147707 filed in the Republic of Korea on Nov. 30, 2012 and Nov. 29, 2013, respectively, the entire contents of which are incorporated herein by reference.

TECHNICAL FIELD

The present invention relates to an anode active material for a lithium secondary battery and a lithium secondary battery using the same. More specifically, the present invention relates to an anode active material comprising a silicon oxide which can provide improved life characteristics and high capacity.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them.

In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

Generally, a lithium secondary battery is prepared by using a cathode and an anode which are each made of a material capable of intercalating and disintercalating lithium ions, and filling an organic or polymer electrolyte solution between the cathode and the anode, and the battery produces electrical energy by oxidation and reduction when the lithium ions are intercalated and disintercalated in the cathode and the anode.

In lithium secondary batteries which are currently available, an anode is mostly made of carbon-based materials as an electrode active material. Particularly, graphite which has been commercially available has a real capacity of about 350 to 360 mAh/g which approaches its theoretical capacity of about 372 mAh/g. Although a carbon-based material such as graphite has a capacity of such a degree, it does not meet the demand for high-capacity lithium secondary batteries as an anode active material.

In order to meet such a demand, attempts have been made to use metals as an anode active material, for example, Si, Sn, an oxide and an alloy thereof, that have a higher charge/discharge capacity than the carbon materials and that allow electrochemical alloying with lithium.

However, this metal-based electrode active material has a great change in volume during charging/discharging, which may cause cracks and micronization to the active material. Secondary batteries using this metal-based anode active material may suddenly be deteriorated in capacity and have reduced cycle life during repeated charging/discharging cycles. Accordingly, there is a need for solving the deterioration of capacity and cycle life by the use of such a metal-based electrode active material.

DISCLOSURE

Technical Problem

Therefore, it is an object of the present invention to provide a silicon-based anode active material which can provide high capacity and does not deteriorate life characteristics, and an anode and a secondary battery comprising the anode active material.

Technical Solution

In order to achieve the object, in accordance with one aspect of the present invention, there is provided an anode active material, comprising silicon-based particles obtained from at least one of silicon, a silicon oxide and a silicon alloy, the silicon-based particles having a faceted shape.

In accordance with one embodiment of the present invention, the silicon-based particles are a faceted type of anode active material and such a faceted type of silicon-based particles may come into contact with each other by at least one of line contact and area contact.

In accordance with one embodiment of the present invention, the faceted type of silicon-based particles may have a polyhedral shape consisting of only facets as a whole.

In accordance with one embodiment of the present invention, the silicon-based particles having a faceted shape may have a surface area greater than that of spherical silicon-based particles by 1.01 to 5 times when their volume is in the same level as volume of the spherical silicon-based particles.

In accordance with one embodiment of the present invention, the silicon-based particles having a faceted shape may have an average diameter of 0.1 to 30 μM.

In accordance with one embodiment of the present invention, the silicon-based particles having a faceted shape may be a silicon alloy which comprises silicon and at least one element selected from the group consisting of Sn, Zr, Mn, Ni, Fe, Ca, Ce, La, Cr, Al, Co, Sb, Bi, As, Ge, Pb, Zn, Cd, In, Ti, Cu, Bi, Mo and Ga.

In accordance with one embodiment of the present invention, the anode active material may be a single phase consisting of only silicon-based particles obtained from at least one of silicon, a silicon oxide and a silicon alloy.

In accordance with another aspect of the present invention, there is provided an anode for a lithium secondary battery, comprising a current collector and an anode active material layer formed on at least one surface of the current collector, wherein the anode active material layer comprises the anode active material according to the present invention.

Further, in accordance with yet another aspect of the present invention, there is provided a lithium secondary battery, comprising a cathode, an anode, and a separator interposed between the cathode and the anode, wherein the anode is one defined in the present invention.

Advantageous Effects

The anode active material of the present invention comprises silicon-based particles obtained from at least one of silicon, a silicon oxide and a silicon alloy, and the silicon-based particles have a faceted shape, thereby providing high capacity and good life characteristics without causing any deterioration which has been generated in the use of conventional silicon-based particles, and eventually providing a lithium secondary battery having such characteristics.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The anode active material of the present invention is characterized by comprising silicon-based particles obtained from at least one of silicon, a silicon oxide and a silicon alloy, the silicon-based particles having a faceted shape.

Figure 1:
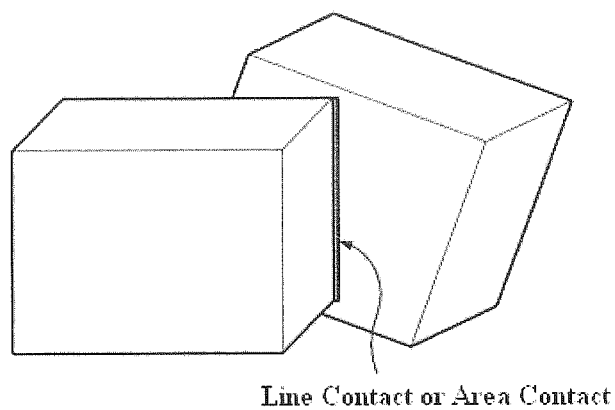
FIG. 1 shows Si alloy particles having a faceted shape, prepared in Example 1.
Figure 2:
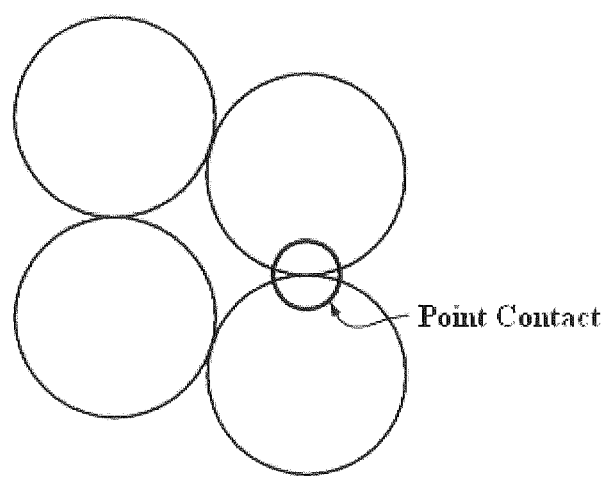
FIG. 2 shows Si alloy particles having spherical shape, prepared in Comparative Example 1.

In the case that conventional silicon-based particles are used as an anode active material, these particles are subject to volume change while lithium is charged and discharged, and thus may be cracked and micronized. For this reason, secondary batteries using such an anode active material may suddenly be deteriorated in capacity and have reduced cycle life during repeated charging/discharging cycles. In order to minimize such a volume expansion, attempts have been made to control the crystallinity of silicon-based particles or form a Si-activated core part and an inactive matrix structure. However, such attempts are merely relevant to the internal structure of silicon-based particles. As another attempt, the present inventors have endeavored to control the external shape of silicon-based particles used as an anode active material, not the internal structure thereof, thereby preventing life characteristics from being deteriorated by the volume change of the anode active material during charging and discharging, and specifically found that the use of silicon-based particles having a faceted shape, instead of conventional spherical particles, can provide good life characteristics even if volume expansion occurs because the faceted particles can come into easy contact with each other, as compared with the spherical particles. That is, the present inventors have applied a faceted shape in the external structure of silicon-based particles, based on the probability that if initial contact between active materials becomes increased from the beginning of charging and discharging cycles under the conditions of the same composition and the same particle size, a contact area between the active materials can continuously increase even after the cycles are progressed. In reference to FIGS. 1 and 2, FIG. 2 shows spherical anode active materials which come into point contact with each other, while FIG. 1 shows faceted anode active materials which satisfy at least one of line contact or area contact with each other. On the basis of this matter, when an active material has a faceted shape, a contact area between the active materials increases. FIG. 1 schematically shows the faceted shape of particles, and the present invention is not limited to the shape shown.

As used herein, the term "faceted" for the external shape of Si-based particles refers to a three-dimensional solid object bounded by polygonal facets, i.e., encompasses any particles consisting of various polygons, not a spherical form. Such a faceted form includes a convex polyhedron, a concave polyhedron, or both. The external shape of the Si-based particles, i.e. all polygonal faces (facets) consisting of the outer surfaces of such particles, may be constant or not be constant (i.e., amorphous). Also, multiple Si-based particles may have shapes different from each other.

In addition, the faceted type of Si-based particles according to the present invention may have a polyhedral shape consisting of only facets (planes) as a whole, or a polyhedral shape having facets (planes) in a substantial part thereof, i.e., partially not being spherical.

In accordance with one embodiment of the present invention, the silicon-based particles having a faceted shape may have a surface area greater than that of spherical silicon-based particles by 1.01 to 5 times, preferably 1.5 to 4 times when their volume is in the same level as volume of the spherical silicon-based particles.

By satisfying such a surface area range, more easy contact between particles can be achieved, and secondary battery comprising such particles can exhibit good life characteristics.

In accordance with another embodiment of the present invention, the silicon-based particles having a faceted shape may have an average diameter of 0.1 to 30 μm.

The anode active material of the present invention may be a silicon-based substance obtained from at least one of silicon, a silicon oxide and a silicon alloy, and among these, the silicon alloy is preferred. The silicon alloy comprises silicon and at least one element selected from the group consisting of Sn, Zr, Mn, Ni, Fe, Ca, Ce, La, Cr, Al, Co, Sb, Bi, As, Ge, Pb, Zn, Cd, In, Ti, Cu, Bi, Mo and Ga. If the silicon alloy is used as a silicon-based substance, a phase of only Si functions to develop capacity, while an alloy phase of Si and two kinds of elements other than Si or an alloy phase of two kinds of elements acts as the matrix of Si. Therefore, the silicon alloy has superior life characteristics and the ability of thickness expansion, as compared with a simple Si-based substance, and also the silicon alloy is free of oxygen to provide high initial efficiency, as compared with SiO. Accordingly, the silicon alloy is preferably used, but other silicon-based substances mentioned above may also be used in the present invention without being limited to only the silicon alloy.

In addition, the anode active material of the present invention may be a single phase consisting of only silicon-based particles obtained from at least one of silicon, a silicon oxide and a silicon alloy, i.e., not comprising other kinds of substances except the silicon-based particles.

In the present invention, the silicon-based particles having a faceted shape may be prepared by the following method.

Specifically, the silicon-based substance as mentioned is provided, and is subject to milling using a ball-mill, a jet-mill or a vibration mill so that the substance is milled by way of collision and then has a faceted shape.

The anode active material thus prepared can be used in the preparation of an anode according to a conventional method known in the art. Also, in the present invention, a cathode may be prepared by a conventional method known in the art, similar to the preparation of an anode. For example, the anode active material of the present invention is mixed with a binder, a solvent, and optionally a conducting material and a dispersing agent, followed by stirring, to produce a slurry and applying the slurry on a current collector, followed by compression, to prepare an electrode.

The binder which may be used in the present invention includes various kinds of binder polymers including vinylidenefluoride-hexafluoropropylene copolymer (PVDF-co-HFP), polyvinylidenefluoride, polyacrylonitrile, and polymethylmethacrylate.

A cathode active material which may be used in the present invention preferably includes a lithium-containing transition metal oxide, for example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), (0.5<x<1.3, 0<z<2), $Li_xMn_{2-z}Co_zO_4$ (0.5<x<1.3, 0<z<2), $Li_xCoPO_4$ (0.5<x<1.3), $Li_xFePO_4$ (0.5<x<1.3), and a mixture thereof. The lithium-containing transition metal oxide may be coated with a metal such as Al or a metal oxide. In addition, lithium-containing transition metal sulfide, selenide, or halide may also be used.

After the electrode is prepared, a conventional lithium secondary battery including the cathode, the anode, a separator interposed between the cathode and the anode, and an electrolyte solution may be prepared.

The electrolyte solution used in the present invention comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte solution used in the present invention comprises an organic solvent which is conventionally used in an electrolyte solution for a lithium secondary battery, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfoxide, acetonitrile, di methoxyethane, diethoxyethane, vinylene carbonate, sulforane, γ-buryrolactone, propylene sulfite, and tetrahydrofuran and a mixture thereof. In particular, among the above carbonate-based organic solvents, ethylene carbonate and propylene carbonate that are cyclic carbonates are preferred, since they have high viscosity and consequently a high dielectric constant to easily dissociate the lithium salt in the electrolyte. More preferably, such a cyclic carbonate is used as a mixture with a linear carbonate having a low viscosity and a low dielectric constant, such as dimethyl carbonate and diethyl carbonate in a suitable ratio, to provide an electrolyte having a high electric conductivity.

Optionally, the electrolyte solution used in the present invention may further include an additive, such as an overcharge inhibitor which is conventionally used in an electrolyte.

Also, the separator which may be used in the present invention includes a single-layered or multi-layered porous polymer film conventionally used as a separator, and a porous non-woven fabric conventionally used as a separator, and the like. The porous polymer film may be made of polyolefin-based polymer, for example, ethylene homopolymer, propylene homopolymer, ethylene/butene copolymer, ethylene/hexene copolymer, and ethylene/methacrylate copolymer, and the porous non-woven fabric may be made of, for example, high-melting glass fibers, polyethylene terephthalate fibers, and the like. However, the present invention is not limited thereto.

A battery case used in the present invention may be any one conventionally used in the art, and the shape of the battery case is not particularly limited depending on its uses. For example, the shape of the battery case may be cylindrical, prismatic, pouch, or coin.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Figure 3:
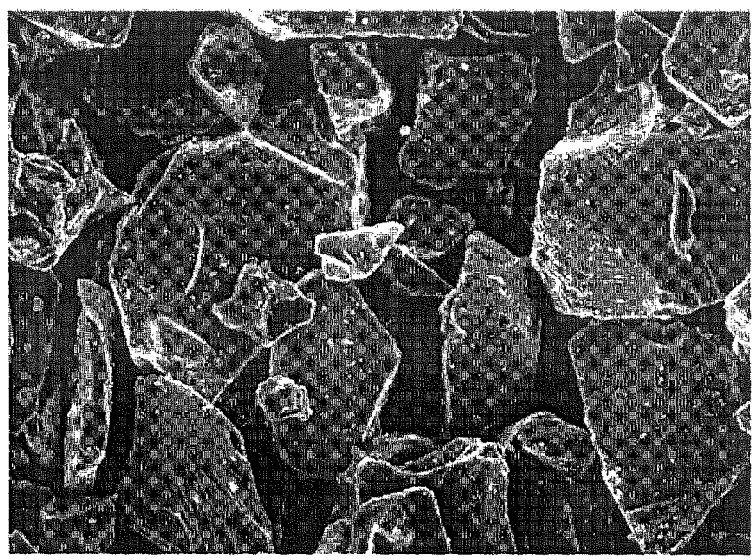
FIG. 3 is an SEM photograph of Si alloy particles having a faceted shape, prepared in Example 1.
Figure 5:
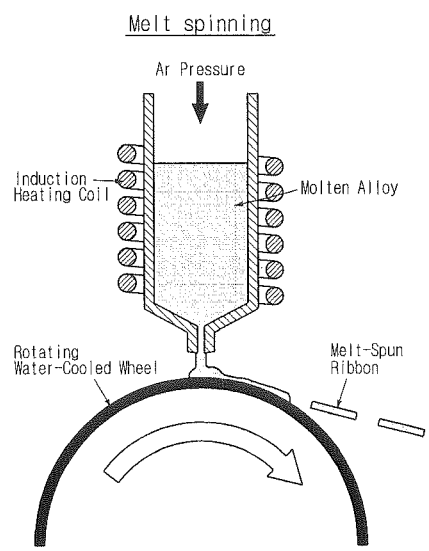
FIG. 5 is an apparatus of preparing Si alloy particles having a faceted shape, used in Example 1.

Example 1: Anode Active Material Comprising Silicon-Based Articles Having a Faceted Shape Si, Al and Fe were mixed in an atomic ratio of 75/15/10 (%) and heated to obtain a molten Si alloy. The molten alloy was sprayed on a rotary copper wheel using argon gas under vacuum, as shown in FIG. 5, to produce a Si/Al/Fe alloy in the form of a thin plate. The alloy was milled and distributed so that $D_{50}$ is 5 μm. The anode active material thus prepared was analyzed by a scanning electron microscope (SEM), and the SEM image thereof is shown in FIG. 3.

Figure 4:
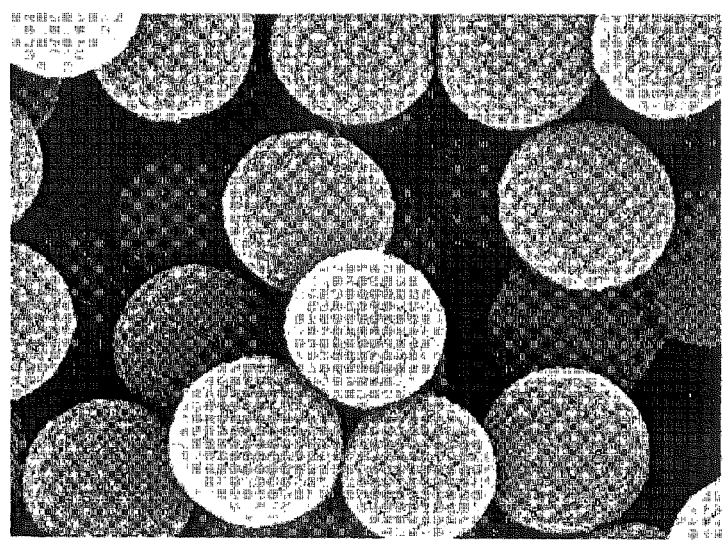
FIG. 4 is an SEM photograph of Si alloy particles having spherical shape, prepared in Comparative Example 1.
Figure 6:
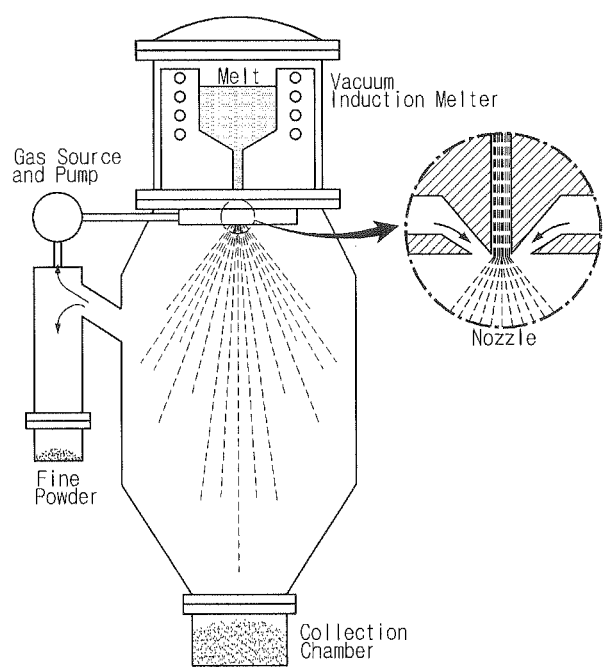
FIGS. 6 and 7 are apparatuses of preparing Si alloy particles having spherical shape, used in Comparative Example 1.
Figure 7:
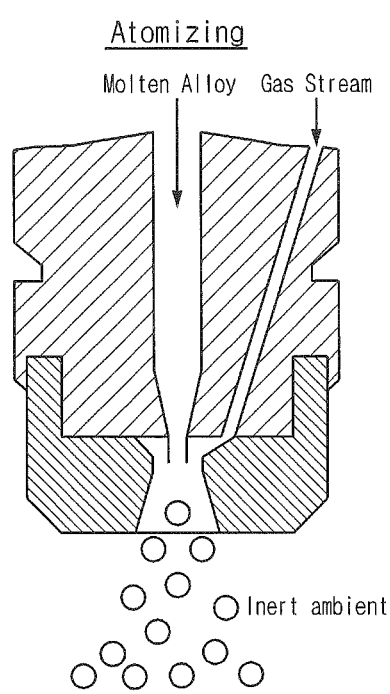

Comparative Example 1: Anode Active Material Comprising Silicon-Based Articles Having Spherical Shape A molten Si alloy was prepared by the same procedure as Example 1, and the molten alloy was emitted through the nozzle of a gas atomizer, as shown in FIGS. 6 and 7, and then cooled down under argon gas atmosphere, to produce spherical particles of the Si alloy. The particles were measured for their particle size, in which the particles were confirmed to have $D_{50}$ of 5 μm. Also, the SEM image of the particles is shown in FIG. 4.

Preparation Example 1: Preparation of Coin-Type Half-Cell

The anode active materials prepared in Example 1 and Comparative Example 1 were each used to obtain electrode slurries. Each slurry obtained was coated on one surface of a copper current collector in a thickness of 65 μm, dried and compressed, followed by punching to the desired size, to obtain an electrode.

Metallic lithium was used as a cathode, and a polyolefin separator was interposed between the anode and the cathode obtained above, to obtain an electrode assembly.

Ethylene carbonate (EC) and diethyl carbonate (DEC) were mixed at a ratio of 30:70 (vol %), to which LiPF$_6$ and 5% of FEC were added, to obtain 1M LiPF$_6$ of non-aqueous electrolyte solution.

Experimental Example 1: Charge/Discharge Characteristics of Batteries

The half-cells prepared in Preparation Example 1, in which the anode active materials of Example 1 and Comparative Example 1 were each used, were evaluated for their charge/discharge characteristics and life characteristics, and the results thereof are shown in Table 1.

<Charge/Discharge Conditions of Coin-Type Half-Cells>

Charge condition: Charging of the batteries was conducted up to 5 mV at constant current, and completed when a current density reached 0.005 C.

Discharge condition: Discharging of the batteries was conducted up to 1.0 V at constant current.

TABLE 1

| | Discharge Capacity (mAh/g) | Capacity before charging (mAh/g) | Initial Efficiency (%) | Normalized Capacity (%) @ 50$^{th}$ cycle |
|---|---|---|---|---|
| Ex. 1 | 1050 | 1235 | 85.0 | 86 |
| Com. Ex. 2 | 1042 | 1229 | 84.8 | 64 |

What is claimed is:

1. An anode active material, comprising silicon-based particles obtained from at least one of silicon, a silicon oxide and a silicon alloy, the silicon-based particles being solid and having a faceted shape,
    wherein the silicon-based particles having a faceted shape comprise a silicon alloy which comprises silicon and at least one element selected from the group consisting of Mn and Ce, and
    wherein the silicon-based particles having a faceted shape have a surface area greater than that of spherical silicon-based particles by 1.5 to 4 times when their volume is in the same level as volume of the spherical silicon-based particles.

2. The anode active material of claim 1, wherein the silicon-based particles are a faceted anode active material and the faceted silicon-based particles come into contact with each other by at least one of line contact whereby edges of particles are in contact with one another and area contact whereby surface areas of particles are in contact with one another.

3. The anode active material of claim 1, wherein the faceted silicon-based particles have a polyhedral shape consisting of a plurality of polygons.

4. The anode active material of claim 1, wherein the silicon-based particles having a faceted shape have an average diameter of 0.1 to 30 μm.

5. The anode active material of claim 1, which is a single phase consisting of only silicon-based particles obtained from at least one of silicon, a silicon oxide and a silicon alloy.

6. An anode for a lithium secondary battery, comprising a current collector; and an anode active material layer formed on at least one surface of the current collector,
    wherein the anode active material layer comprises the anode active material of claim 1.

7. A lithium secondary battery, comprising a cathode, an anode, and a separator interposed between the cathode and the anode,
    wherein the anode is defined in claim 6.

8. An anode for a lithium secondary battery, comprising a current collector and an anode active material layer formed on at least one surface of the current collector, the anode active material layer comprising an anode active material including silicon-based particles obtained from at least one of a silicon oxide and a silicon alloy, the silicon-based particles being solid and having a faceted shape, characterized in that the silicon-based particles having a faceted shape have an average diameter of 0.1 to 30 μm,
    wherein the silicon-based particles having a faceted shape are obtained by heating one or both of 1) a compound consisting of a silicon oxide and 2) a combination of elements consisting of a silicon mixed with at least one element selected from the group consisting of Mn, Fe, Ca, Ce, La, Cr, Co, Bi, Pb, Cd, and Mo to obtain a molten product, spraying the molten product on a rotary copper wheel using argon gas under vacuum to produce a thin plate, and then milling the thin plate, an output of the milling being the silicon-based particles having a faceted shape, and
    wherein the silicon-based particles come into contact with each other by at least one of line contact whereby edges of particles are in contact with one another and area contact whereby surface areas of particles are in contact with one another.

9. A method for preparing an anode for a lithium secondary battery comprising:
    obtaining silicon-based particles having a faceted shape as defined in claim 8 through the performance of steps comprising:
        mixing and heating a combination of elements consisting of a silicon and at least one element selected from the group consisting of Mn, Fe, Ca, Ce, La, Cr, Co, Bi, Pb, Cd and Mo to obtain a Si alloy;
        spraying the Si alloy on a rotary copper wheel using argon gas under vacuum to produce the Si alloy in the form of a thin plate; and
        milling the Si alloy in the form of the thin plate,
        wherein subsequent to milling, silicon-based particles are obtained having a solid faceted shape with an average diameter of 0.1 to 30 μm;
    applying the silicon-based particles on a current collector; and
    compressing the silicon-based particles on the current collector to form the anode for the lithium secondary battery.

10. The method for preparing an anode for a lithium secondary battery of claim 9, wherein the combination of elements consists of a silicon and at least one element selected from the group consisting of Mn, Ce and Pb.

11. An anode for a lithium secondary battery, comprising a current collector and an anode active material layer formed on at least one surface of the current collector, the anode active material layer comprising an anode active material including silicon-based particles obtained from a silicon alloy, the silicon-based particles having a faceted shape, characterized in that the silicon-based particles having a faceted shape have an average diameter of 0.1 to 30 μm, wherein the silicon-based particles having a faceted shape are obtained by mixing and heating a combination of elements consisting of silicon and at least one element selected from the group consisting of Mn, Fe, Ca, Ce, La, Cr, Co, Bi, Pb, Cd, and Mo to obtain a molten alloy, spraying the molten alloy on a rotary copper wheel using argon gas under vacuum to produce the silicon alloy in the form of a thin plate, and then milling the thin plate, an output of the milling being the silicon-based particles having a faceted shape, wherein the silicon alloy is free of oxygen, and wherein the silicon-based particles come into contact with each other by at least one of line contact whereby edges of particles are in contact with one another and area contact whereby surface areas of particles are in contact with one another.

12. The anode for a lithium secondary battery of claim 11, wherein the silicon-based particles having a faceted shape comprises a silicon alloy which comprises silicon and at least one element selected from the group consisting of Mn, Ce and Pb.

13. An anode active material, comprising silicon-based particles obtained from an Si/Al/Fe alloy, the silicon-based particles having a faceted shape, characterized in that the silicon-based particles having a faceted shape have an average diameter of 0.1 to 30 μm, wherein the silicon-based particles having a faceted shape are obtained by mixing and heating Si, Al and Fe to obtain a molten alloy, spraying the molten alloy on a rotary copper wheel using argon gas under vacuum to produce the Si/Al/Fe alloy in the form of a thin plate, and then milling the thin plate, an output of the milling being the silicon-based particles having a faceted shape, and wherein the Si/Al/Fe alloy is free of oxygen.

14. The anode active material of claim 13, wherein the atomic ratio of Si, Al and Fe is 75/15/10(%).

15. An anode for a lithium secondary battery, comprising a current collector and an anode active material layer formed on at least one surface of the current collector, wherein the anode active material layer comprises the anode active material of claim 13.

* * * * *